United States Patent [19]

Nagel

[11] Patent Number: 4,564,101

[45] Date of Patent: Jan. 14, 1986

[54] APPARATUS FOR TRANSPORTING DEVELOPED DISC FILMS IN COPYING MACHINES

[75] Inventor: Erich Nagel, Anzing, Fed. Rep. of Germany

[73] Assignee: Agfa-Gevaert Aktiengesellschaft, Leverkusen, Fed. Rep. of Germany

[21] Appl. No.: 557,743

[22] Filed: Dec. 2, 1983

[30] Foreign Application Priority Data

Dec. 9, 1982 [DE] Fed. Rep. of Germany ....... 3245539

[51] Int. Cl.$^4$ ............................................. B65G 47/00
[52] U.S. Cl. ............................... 198/346.2; 198/474.1; 198/478.1
[58] Field of Search ............... 198/478, 339, 378, 480, 198/689, 377, 690, 345, 482, 580; 355/53, 54; 101/38 A–40, 38 R; 89/33.16, 33.17, 33.25

[56] References Cited

U.S. PATENT DOCUMENTS

| | | | |
|---|---|---|---|
| 2,521,306 | 9/1950 | Peterson, Jr. et al. | 198/480 |
| 2,886,165 | 5/1959 | Eger | 198/377 |
| 2,906,416 | 9/1959 | Yeo et al. | 198/377 |
| 3,730,356 | 5/1973 | Bossons et al. | 198/689 |
| 4,380,939 | 4/1983 | Gardner | 198/345 |
| 4,396,282 | 8/1983 | Anderson | 355/53 |

FOREIGN PATENT DOCUMENTS 2849126  6/1979  Fed. Rep. of Germany ...... 198/378

Primary Examiner—Joseph E. Valenza
Assistant Examiner—Darrel G. Dayoan
Attorney, Agent, or Firm—Peter K. Kontler

[57] ABSTRACT

Disc films are transported to, rotated at and transported away from the copying station of a copying machine by an apparatus having a first turntable which receives successive films from one or more supply magazines and delivers the films seriatim to a transferring unit which transfers successive films onto a second turntable that partly overlaps the first turntable. The second turntable delivers successive films to the copying station and, if necessary, to one or more additional treating stations where the films are rotated by discrete prime movers prior to returning into the range of the transferring unit. The latter transfers a film from the second onto the first turntable subsequent to each transfer of a film from the first onto the second turntable, and the first turntable delivers the thus returned films to one or more collecting magazines. The turntables are mounted at different levels and are indexed by discrete mechanisms so that vibratory and/or other strap movements of the first turntable are not communicated to films on the second turntable. The apparatus constitutes a module which can be installed in existing copying machines.

20 Claims, 3 Drawing Figures

APPARATUS FOR TRANSPORTING DEVELOPED DISC FILMS IN COPYING MACHINES

BACKGROUND OF THE INVENTION

The present invention relates to apparatus for manipulating disc films, and more particularly to improvements in apparatus for transporting exposed and developed disc films in copying machines. Still more particularly, the invention relates to improvements in automatic apparatus for the transport of exposed and developed disc films through a copying machine wherein selected frames or all frames of some or all of the films are imaged onto photographic paper or the like.

A disc film comprises a relatively sturdy hub with a central aperture and an annulus of normally fifteen film frames around the hub. In heretofore known apparatus for transporting exposed and developed disc films through a copying machine, successive disc films are transferred from a magazine onto a turntable which transports the films to several successive treating stations one of which is the copying or printing station, and thereupon to a second magazine wherein the films are stored in the form of stacks or the like. The film which arrives at the copying station must be rotated about its axis in order to move successive or selected frames into register with the copying window of the machine. The turntable is indexible through angles of 45 degrees and carries eight equidistant holders for discrete disc films. Each such holder comprises a pivotable flap with a tiltable dish-shaped support. The turntable transports successive holders for disc films to and thereupon beyond eight successive stations including two loading or charging stations, a decoding station, a scanning station, a copying station, an intermediate station, and two removing stations. The two loading or charging stations accommodate a first magazine (e.g., in the form of a twin cylinder) which contains one or more stacks of exposed and developed disc films and from which such films are removed for transfer onto the turntable, namely, onto pairs of neighboring holders on the turntable. The two removing stations accommodate a similar magazine which receives films from the oncoming holders on the turntable and accumulates such films in the form of one or more stacks.

A drawback of the just described conventional apparatus is that the transfer of disc films onto and/or the removal of disc films from the turntable invariably involves at least some vibratory and/or other stray movements which are transmitted to the aforementioned flaps and thence to the respective disc films. Such stray movements of disc films at the scanning and/or copying station can adversely influence the quality (particularly the sharpness) of prints. While it is conceivable to maintain the turntable at a standstill while a disc film is located at the copying station, i.e., to load films onto and to remove films from the turntable during the intervals between the making of prints from successive disc films, this would practically double the interval which elapses while a disc film is on its way from the first to the second magazines.

Moreover, the just described conventional apparatus cannot be installed in many existing copying machines without extensive alterations of such machines. The main reason for the need for such extensive alterations, before the conventional apparatus can be installed in a number of presently known copying machines, is that the printing paper must be transported in a direction radially of the disc film at the copying station. This creates problems in connection with the installation of optical elements at the copying station as well as in connection with the advancement of printing paper through the copying station.

OBJECTS AND SUMMARY OF THE INVENTION

An object of the invention is to provide a novel and improved apparatus which can manipulate exposed and developed disc films and is constructed and assembled in such a way that it can be readily installed in or on many existing copying machines and that the installation requires a minimum of alterations.

Another object of the invention is to provide an apparatus which is constructed and assembled in such a way that the disc film which is located at the copying station need not share any vibratory and/or other stray movements of disc films which are being introduced into and/or removed from the apparatus.

A further object of the invention is to provide an apparatus of the above outlined character which can be assembled into a simple and compact module ready for installation in an existing copying machine.

An additional object of the invention is to provide an apparatus which can treat the films gently, especially at the copying station and/or at any other station where vibratory and/or other stray movements of disc films could adversely influence the quality of prints and/or entail damage to disc films.

A further object of the invention is to provide an apparatus which is capable of rotating or indexing a disc film at the copying station while fresh disc films are being admitted thereinto and/or while copied films are being removed therefrom so that the interval of dwell of each film in the apparatus is very short, and wherein such mode of operation does not adversely influence the quality of prints.

Still another object of the invention is to provide the apparatus with novel and improved means for conveying and/or otherwise manipulating disc films during transport from one or more first magazines to one or more second magazines by way of the copying station.

An additional object of the invention is to provide a novel and improved method of transporting and otherwise manipulating disc films on their way toward, at, and from the copying station.

Another object of the invention is to provide a method which entails gentle treatment of disc films, not only for the purpose of avoiding damage thereto but also for the purpose of ensuring the making of satisfactory prints.

A further object of the invention is to provide a method of the above outlined character which allows for the processing of large numbers of disc films per unit of time.

One feature of the invention resides in the provision of an apparatus for transporting exposed and developed disc films toward and away from a copying station and of manipulating disc films at such station. The apparatus comprises a first conveyor which defines a first endless path, film supplying, film transferring and film receiving means which are adjacent to successive first, second and third portions of the first path and are respectively arranged to deliver films into the first path, to transfer the thus delivered films from and back into the first path, and to receive films from the first path, a second conveyor which defines a second endless path having an initial portion adjacent to the second portion of the first path so that the transferring means can deliver disc films into and can receive films from the initial portion, and at least one additional portion at the copying station, and means for rotating each film which reaches the additional portion of the second path on its way from and back to the initial portion. Thus, each disc film advances from the first portion into the second portion of the first path, thereupon into the initial portion of the second path, then to the additional portion and back to the initial portion of the second path, from the initial portion of the second path to the second portion of the first path and thereupon to the third portion of the first path.

The first conveyor preferably comprises a first indexible turntable and the second conveyor then preferably comprises a second indexible turntable overlapping a portion of the first turntable in the region of the transferring means, i.e., the initial portion of the second path can overlap (or can be overlapped by) the second portion of the first path. The two turntables are disposed in two different planes, preferably in two different horizontal planes, and the apparatus preferably further comprises discrete first and second indexing means for the respective turntables.

The transferring means preferably comprises elevator means for moving disc films between the levels of the two turntables. Such elevator means can comprise carrier means for discrete films and magnetically operated displacing means for the carrier means. For example, the first turntable can be provided with discrete carrier means for each disc film thereon, and such carrier means can be shifted with reference to the first turntable on arrival in the second portion of the first path in order to deliver the disc film thereon into the second path and to thereupon receive a disc film from the second path for delivery back into the first path. Each carrier means can cooperate with means for clamping the disc film thereon during certain stages of travel of such disc film with the respective carrier means.

The second turntable can be disposed above the first turntable, and the second conveyor can further comprise a stationary platform constituting a base plate for the films which are being conveyed along the second path from and back to the initial portion of the second path (i.e., from the initial portion, to the additional portion or portions and thereupon back to the initial portion). The second turntable then comprises means for entraining the films along the platform to thereby move such films along the second path. The platform can be provided with a socket or cutout in register with the initial portion of the second path; the transferring means then comprises means for moving successive carriers from the second portion of the first path into the socket preparatory to entrainment of the freshly transferred film from the carrier in the socket along the platform, i.e., along the second path toward and thereupon beyond the additional portion of the second path. The carrier which dwells in the socket of the platform then receives the oncoming disc film (which is on its way from the additional portion of the second path) before it returns into the second portion of the first path so that it can continue its movement along the first path toward the third portion where it is relieved of the film and is free to receive a fresh film as soon as it reaches the first portion of the first path. Each carrier can be dimensioned to at least substantially fill the socket of the platform.

The aforementioned rotating means is preferably designed to rotate the disc film in the additional portion or portions of the second path through the medium of the aforementioned entraining means, i.e., through the medium of the means which serve to move successive disc films along the platform, namely, along the second path. Such entraining means can comprise rotary protuberances which can be introduced into the central apertures of disc films. The protuberance which is located in the initial portion of the second path at the time the latter receives a disc film from the first path penetrates into the central aperture of the oncoming disc film and thereupon moves the disc film along the platform toward the first or the only additional portion of the second path. The rotating means preferably comprises rotors which are operatively connected with the protuberances and prime mover means adjacent to the additional portion of the second path and serving to drive the rotor which is advanced into such portion of the second path. The prime mover means can be mounted on a support (e.g., on a plate at a level above the second path) movable between first and second positions in which the prime mover means respectively engages with and is disengaged from the rotor in the additional portion of the second path. The means for moving the support can include a fluid-operated motor. The apparatus preferably further comprises detent means for maintaining each rotor in a predetermined angular position when the respective rotor is not engaged by the prime mover means to thus ensure that the protuberance can enter the central aperture of a disc film when the latter is transferred from the first into the second path. To this end, each protuberance can have an axially parallel rib which enters a complementary recess communicating with the central aperture of the film. This ensures that indexing or rotation of the film in the additional portion of the second path can place successive frames of such film into register with the optical system of the copying machine.

The apparatus is preferably further provided with detent means for holding the turntables in predetermined angular positions between successive indexing movements of the turntables. At least one of these detent means can comprise a notched wheel or disc which is coaxial with and shares the angular movements of the respective turntable, a mobile male detent element adjacent to the wheel, and an electromagnet or other suitable means for moving the detent element into and from the notches of the wheel.

Another feature of the invention resides in the provision of a method of transporting exposed and developed disc films to and from the copying station of a copying machine and of manipulating such films at the copying station. The method comprises the steps of introducing successive films into a first portion of and conveying the thus introduced films along a first endless path, transferring successive films from a second portion of the first path into an initial portion of a second endless path, an additional portion of which is disposed at the copying station, and conveying successively transferred films along the second path, rotating successive films about their respective axes in the additional portion of the second path, advancing the thus rotated films into the initial portion of the second path and returning successive films back into the second portion of the first path, advancing the returned films from the second into a third portion of the first path, and withdrawing successive films from the third portion of the first path.

The returning step preferably takes place at least substantially simultaneously with the transfer of successive films from the first into the second path; for example, each transfer of a film from the first path into the second path can be followed by transfer of a film from the second into the first path.

The step of conveying films along the second path can include causing the films or entraining means for the films to slide along a plane surface, such as the top surface of a stationary platform below the second path.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
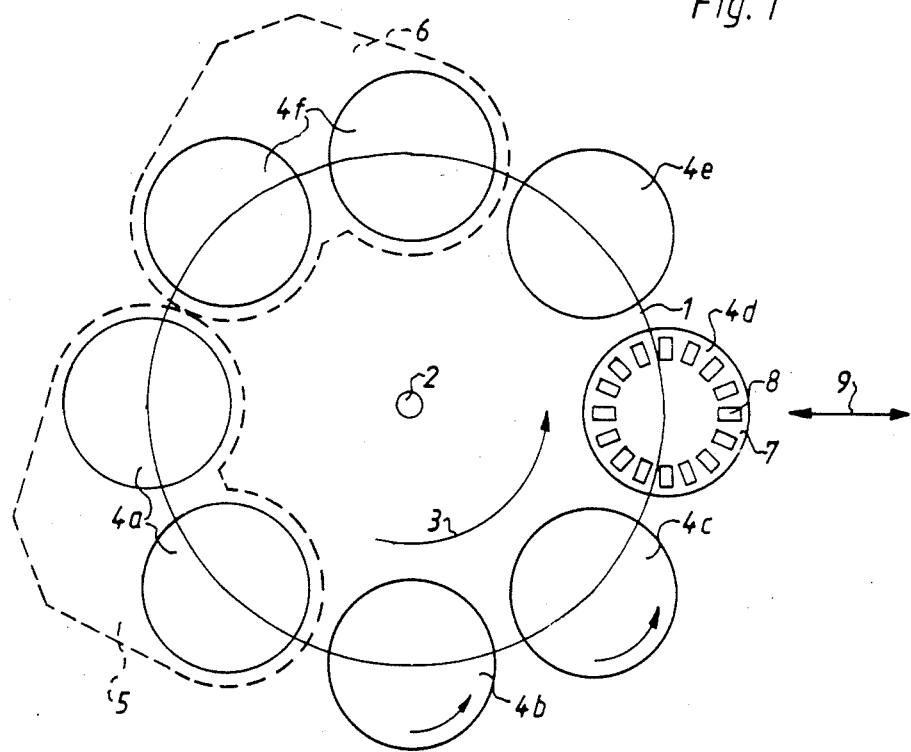
FIG. 1 is a schematic plan view of a conventional apparatus.

FIG. 1 is a schematic plan view of a conventional apparatus which serves to transport successive disc films 7 to and away from a copying station 4d and to rotate each disc film while the latter dwells at the copying station. The apparatus comprises a turntable 1 which is mounted on and is indexible about the axis of a vertical shaft 2, always through angles of 45 degrees. The direction in which the turntable 1 is indexed by a suitable mechanism (not shown) is indicated by the arrow 3. Two of the eight stations which are adjacent to the path of movement of the marginal portion of the turntable 1 are shown at 4a; these stations accommodate a supply magazine 5 (indicated by broken lines) which is provided or associated with means for delivering a pair of discrete disc films 7 to the adjacent portions of the turntable 1 during each second dwell of the turntable between successive indexing movements. For example, the magazine 5 can comprise two upright cylindrical ducts for discrete stacks of superimposed disc films 7; each fresh stack can contain one-hundred disc films.

The stations 4a are followed by three treating stations 4b, 4c and 4d the latter of which is the aforementioned copying station. At the station 4b, successive disc films 7 are scanned by a reading or decoding unit for the presence of strip-shaped or other encoded information. The station 4c accommodates means for monitoring the frames 8 of successive disc films 7 for density and/or color composition so as to allow for proper regulation of the copying operation which takes place at the station 4d. The encoded information can denote the number of prints to be made from some or all frames on a given disc film 7, the dimensions of the prints to be made, the quality (glossy or matte) of the prints to be made and/or other information. The information which is gathered at the stations 4b and 4c is used at the station 4d to make satisfactory prints.

The station 4d is followed by an intermediate station 4e which is neither a treating nor any other meaningful station, and the station 4e is followed by two stations 4f where pairs of disc films 7 are removed during alternate intervals of dwell of the turntable 1. The removed films 7 are stored (preferably stacked) in a second magazine 6 which may but need not be identical with the magazine 5. Successive portions of the turntable 1 are then returned to the stations 4a for reception of fresh disc films 7.

FIG. 1 further shows that the frames 8 of each film 7 (only one of these films is shown in sufficient detail to allow for observation of orientation of the film frames) extend substantially radially of the respective film. Each frame 8 is an elongated rectangle and must be oriented at the copying station 4d in such a way that its two longer sides are parallel with the direction (indicated by a double-headed arrow 9) of transport of printing paper (not shown) in the copying machine. In other words, the turntable 1 must be installed in the copying machine in such a way that the film frame 8 which is about to be imaged onto printing paper (namely, the film frame at the three o'clock position of the disc film 7 at the copying station 4d) is horizontal, as viewed in FIG. 1, it being assumed that the printing paper is transported stepwise in one of the directions indicated by the arrow 9. The height of each of the magazines 5 and 6 is approximately 50 centimeters, and such magazines must be installed in the copying machine proper if the film frames 8 are to be properly copied at the station 4d. The installation of such magazines in the copying machine proper interferes with mounting of the housing for light sources and filters of the copying unit. Thus, the apparatus which is shown in FIG. 1 must be built into a specially designed copying machine or an existing copying machine must undergo extensive and costly alterations in order to be capable of accepting the apparatus.

Another drawback of the illustrated conventional apparatus is that any stray movements of the turntable 1 which are attributable to the operation of the means for supplying films 7 to or for removing films from the turntable are transmitted to the films at the stations 4b, 4c and 4d. This can adversely influence the quality of the prints because the monitoring mechanism at the station 4c might not be able to accurately ascertain the density and/or other characteristics of frames 8 on a disc film 7 and the copying unit might not be able to produce sharp images of vibrating or otherwise moving film frames at the station 4d.

Figure 2:
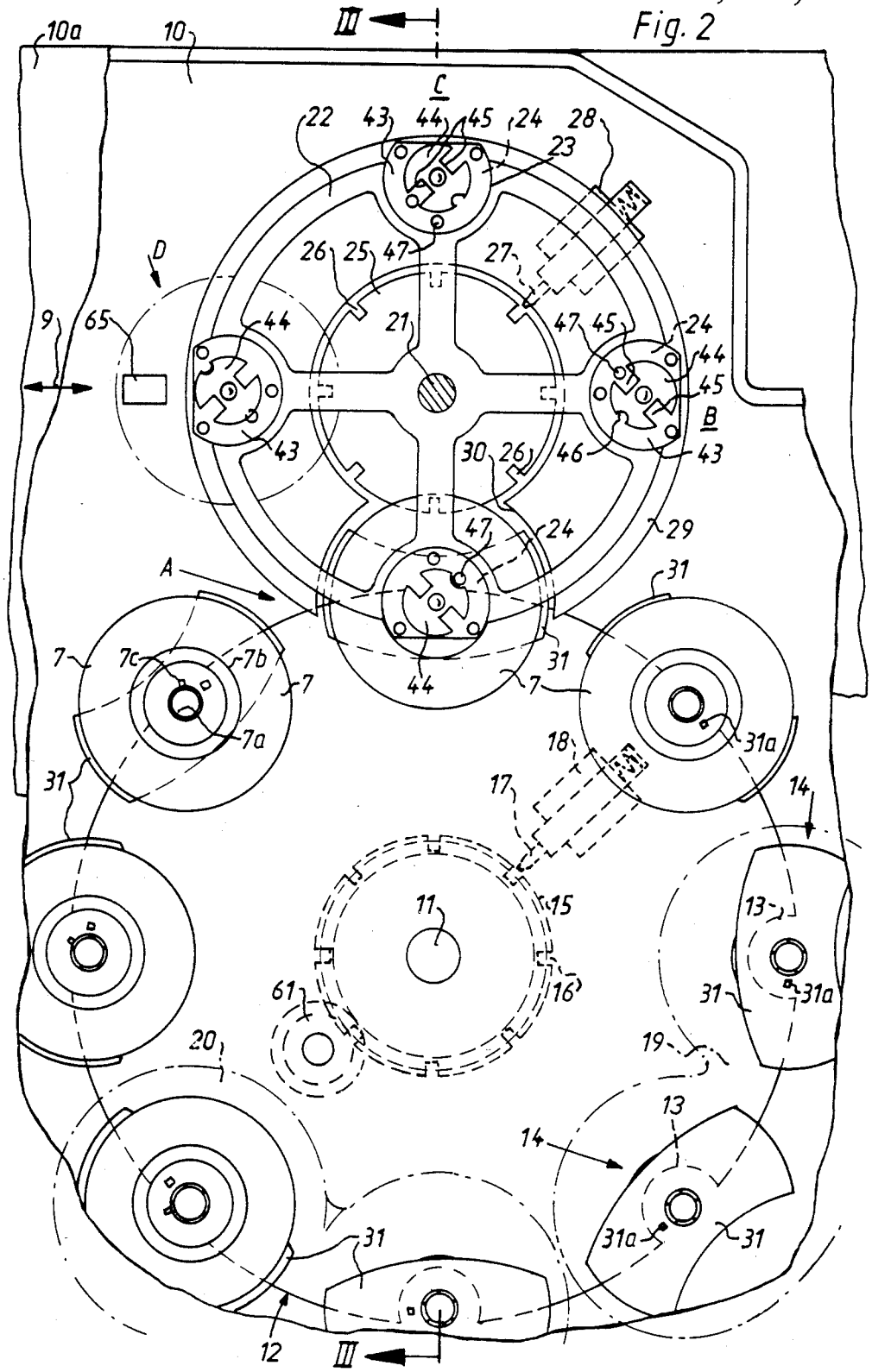
FIG. 2 is a schematic plan view of an apparatus which embodies one form of the present invention.
Figure 3:
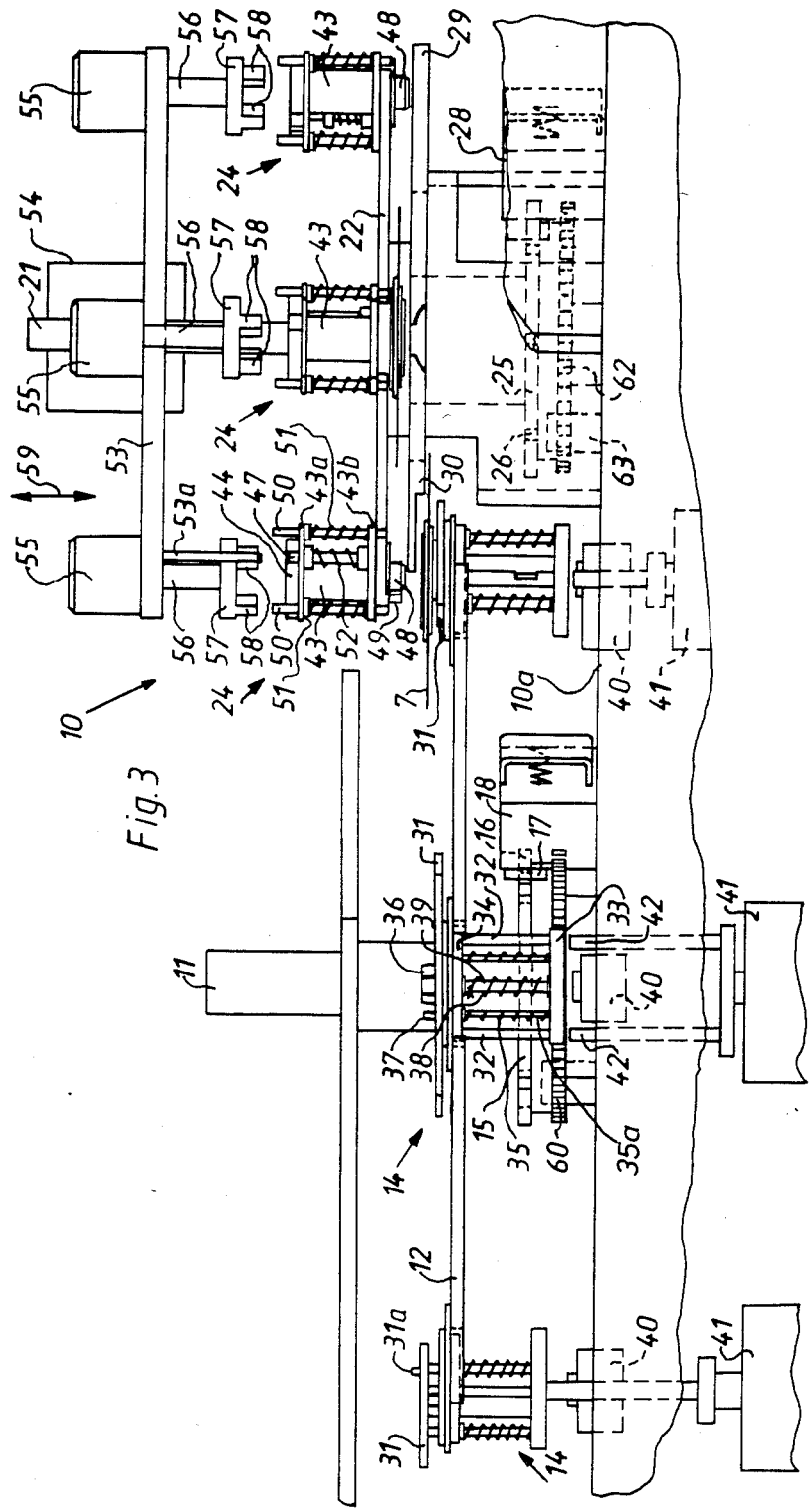
FIG. 3 is a vertical sectional view substantially as seen in the direction of arrows from the line III—III of FIG. 2.

FIGS. 2 and 3 illustrate the details of an apparatus 10 which embodies one form of the present invention. The apparatus 10 constitutes a module or insert which can be mounted on the table 10a of a conventional printing or copying machine by resorting to fastening and positioning means (not shown) of known design.

The apparatus 10 comprises a first upright shaft 11 which is coaxial with and connected to a first conveyor in the form of a horizontal turntable 12. The latter is a relatively thin disc the peripheral surface of which is provided with eight equidistant substantially semicircular cutouts 13. This is due to the fact that the indexing mechanism for the turntable 12 is designed to perform an angular movement through 45 degrees whenever it is set in motion to rotate the turntable in a counterclockwise direction, as viewed in FIG. 2. Each cutout 13 receives a holder 14 which will be described in detail hereinafter. The shaft 11 is further rigidly connected with a notched wheel 15 which is located at a level below the turntable 12 and has eight equidistant peripheral notches 16 (see FIG. 2). This wheel forms part of a detent mechanism which further comprises a reciprocable detent element 17 in the form of a pin constituting the armature of a stationary electromagnet 18. The pin 17 extends substantially or exactly radially of the wheel 15 and is extracted from the adjacent notch 16 before the turntable 12 is indexed. The pin 17 enters the next notch 16 as soon as the indexing operation is completed. The purpose of the detent means including the parts 15 to 18 is to ensure that the turntable 12 invariably assumes one of eight predetermined angular positions upon completion of eight successive indexing steps.

The holders 14 of the turntable 12 are caused to advance, again and again, along an endless circular path including a first portion 19 which is adjacent to a charging or loading station accommodating a magazine 5 (not shown in FIGS. 2 and 3) or an analogous source of fresh disc films 7. This endless first circular path further includes a second portion denoted in FIG. 2 by the reference character A and serving to accommodate a transferring unit which can move successive disc films 7 into and from the endless path at right angles to the plane of FIG. 2. A third portion 20 of the endless path is adjacent to a removing station accommodating a magazine 6 (not shown in FIGS. 2 and 3) or another suitable receptable serving to gather (preferably stack) the disc films.

The shaft 11 is parallel with a second vertical shaft 21 which is non-rotatably connected with a second conveyor including a horizontal turntable 22. This turntable is mounted at a level above the turntable 12 and is indexible through angles of 90 degrees. The peripheral surface of the turntable 22 is formed with four equidistant circular cutouts 23 each of which accommodates a torque transmitting unit 24. The shaft 21 is further connected with a wheel 25 having four equidistant peripheral notches 26 (see particularly the upper part of FIG. 2). The pin-shaped armature 27 of an electromagnet 28 constitutes a detent element which is insertable into and extractible from the neighboring notches 26. The detent mechanism including the parts 25 to 28 serves to invariably maintain the second turntable 22 in one of four predetermined angular positions during each interval of dwell of the turntable 22. The electromagnet 18 and/or 28 can be replaced with a hydraulically or pneumatically operated cylinder and piston unit without departing from the spirit of the invention.

The second conveyor further comprises a stationary horizontal platform 29 which is mounted at a level between the turntables 12, 22 and has a smooth upper side. The platform 29 is a circular disc having a cutout or socket 30 in register with the second portion (A) of the endless path which is defined by the first turntable 12 and with a first or initial portion of the endless second path which is defined by the second turntable 22. The diameter of the socket 30 slightly exceeds the diameter of a film unit 7. As can be seen in FIG. 2, each holder 14 comprises a partly circular carrier 31 which can be lifted from the level of the turntable 12 to the level of the platform 29 so as to at least substantially fill the socket 30. The carriers 31 are disposed at the upper sides of the respective holders 14 and can be considered as parts of the first conveyor including the turntable 12 or as part of the means for transferring disc films 7 from the turntable 12 to the second conveyor including the turntable 22 and the platform 29 or vice versa.

The distance between the shafts 11 and 21 is selected in such a way that the turntable 22 overlaps a portion of the turntable 12, namely, the second portion A of the endless path which is defined by the turntable 12. The arrangement is such that the axis of a disc film 7 in the second portion (A) of the endless first path defined by the turntable 12 coincides with the axis of the torque transmitting unit 24 in the initial portion of the endless second path defined by the turntable 22. The just mentioned film 7 is then held by the respective holder 14 and rests on the carrier 31 of the holder. At such time, the detent mechanism 25 to 28 maintains the turntable 22 in one of its four predetermined angular positions.

As can be readily seen in FIG. 3, each holder 14 comprises the aforementioned carrier 31 each of which is provided with several downwardly extending vertical guide rods 32. The lower end portions of the guide rods 32 are mounted in a plate 33. A further plate 34 is rigidly connected with the turntable 12 and serves as a retainer for coil springs 35 which bear against the plate 33 and surround rod-shaped guides 35a extending in parallelism with the rods 32. The rods 32 are reciprocable in the plate 34. When the springs 35 are free to expand, they maintain the respective carrier 31 in a starting (lower end) position.

Each holder 14 further comprises gripping or clamping jaws 36 which are disposed at the center of the respective carrier 31 and are dimensioned in such a way that they can be fitted into the central aperture 7a in the hub 7b of a disc film 7. An orienting pin 37 is adjacent to each pair of jaws 36 to enter the recess 7c in the hub 7b of the disc film 7 which is mounted on the respective holder 14 and to thus hold the disc film against a change in orientation about its vertical axis. The jaws 36 are held in their retracted or inoperative positions by a spring 38 and are connected with an actuating stud 39 which is movable upwardly against the opposition of the spring 38 to thereby move the respective jaws slightly outwardly. Such mode of clamping or securing objects to holders is known per se and the illustrated clamping or gripping means can be replaced with other suitable devices which are capable of temporarily holding disc films 7 on the turntable 12.

The apparatus 10 further comprises pairs of electromagnets 40, 41 in each of the three portions 19, A and 20 of the endless path which is defined by the turntable 12. The relatively small electromagnets 40 are provided with centrally located reciprocable pin-shaped armatures cooperating with the studs 39 of the holders 14 at the respective stations. For larger electromagnet 41 comprises several pin-shaped reciprocable aramatures or elevator means 42 which can engage the adjacent plates 33 in order to lift the corresponding carriers 31. FIG. 3 merely shows three holders 14 and three pairs of electromagnets 40, 41 for the sake of clarity. The apparatus actually comprises a holder 14 in each of the eight cutouts 13 and five pairs of electromagnets 40, 41, namely, two in the first portion 19, one in the second portion A, and two in the third portion 20 of the endless first path which is defined by the turntable 12.

The details of the torque transmitting devices 24 can be seen in FIG. 3. Each such device comprises a cylindrical housing 43 which is fixedly secured to the turntable 22 and confines a rotor 44 having portions extending upwardly and downwardly beyond the respective housing 43. The portion which extends upwardly beyond the housing 43 resembles a disc and is formed with two recesses 45 which are disposed diametrically opposite each other (note the upper part of FIG. 2). Some upper portion is further provided with a marginal detent notch 46 bounded by a semmicylindrical surface and arranged to receive a spring-biased male detent element 47. The parts 46 and 47 cooperate to hold the rotor 44 in a predetermined angular position whenever the rotor is not positively driven by a prime mover 55. The male detent element 47 extends into the adjacent notch 46 in the upper portion of that rotor 44 which is located at a level above the second portion A of the first endless path. At the treating stations B, C and D (which are adjacent to additional portions of the endless path defined by the second turntable 22), the upper portions of the respective rotors 44 are held in other than their predetermined angular positions, i.e., the male detent elements 47 do not extend into the respective detent notches 46. This is due to the fact that the disc films 7 at the stations B, C and D must change their angular positions in order to allow for scanning of the films for the presence of indicia at the station B, for monitoring the density and/or color composition of successive film frames 8 at the station C, and for the making of prints from successive or selected frames 8 at the station D.

Those portions of the rotors 44 which extend downwardly beyond the respective housings 43 comprise or constitute entraining means in the form of protuberances 48 each of which has an axially parallel extension or rib 49 which can enter a recess 7c when the protuberance 48 extends into the central aperture 7a of the respective hub 7b. The lower end face of each protuberance 48 can slide along the smooth top surface of the stationary platform 29.

FIG. 3 shows that the torque transmitting units 24 are mounted on the turntable 22. The housing 43 of each such unit contains vertically movable pins 50 which are biased by springs 51 so that they tend to move upwardly. The upper portion of each housing 43 comprises a flange 43a having bores for the passage of the respective pins 50. The springs 51 are installed between such upper flanges 43a and the lower flanges 43b of the respective housings 43, and each of these springs bears against a collar close to the upper end portion of the corresponding pin 50.

Each male detent element 47 can be depressed into the respective upper flange 43a against the opposition of a coil spring 52 which is installed in the space between the corresponding flanges 43a, 43b so that the detent element 47 is then expelled from the respective notch 46. The means for depressing the detent elements 47 so that they are moved to a level below the respective notches 46 comprises studs 53a which are mounted on a plate-like support 53 at a level above the torque transmitting units 24. The support 53 is reciprocable along the shaft 21 by a fluid-operated (e.g., pneumatic) motor 54 and carries three prime movers 55, one for each of the torque transmitting units 24 at the stations B, C and D. Means is provided for holding the support 53 against rotation about the axis of the shaft 21. Each prime mover 55 has a downwardly extending output shaft 56 with a claw clutch 57 at its lower end. Each clutch 57 comprises two claws 58 which are disposed diametrically opposite one another and can enter the aforementioned recesses 45 in the upper portion of the rotor 44 therebelow. The prime movers 55 are preferably stepping motors which are constructed and assembled in such a way that their claws 58 assume predetermined angular positions upon completion of a certain number of steps such as is necessary to account for the number of frames 8 on a disc film 7. In the predetermined angular positions, the detent notches 46 of the rotors 44 below the prime movers 55 are in register with the associated male detent elements 47. When the support 53 (which is reciprocable up and down in directions indicated by the double-headed arrow 59) is caused to move upwardly, the clutches 57 are disengaged from the complementary upper portions of the registering rotors 44 (i.e., the claws 48 are lifted above and away from the respective recesses 45). At the same time, the studs 53a (which share the movements of the support 53) allow the detent elements 47 to rise under the action of the respective springs 52 and to penetrate into the adjacent detent notches 46.

When the thus lifted detent elements 47 hold the respective rotors 44 in predetermined angular positions, the recesses 45 do not change their orientation after the turntable 22 completes a quarter turn. This ensures that the claws 58 of the clutches 57 can enter the recesses 45 therebelow when the motor 54 is thereupon caused to lower the support 53 so that the studs 53a expel the male detent elements 47 from the respective notches 46 and the rotors 44 are ready to turn as soon as the registering stepping motors 55 are set in motion.

The means for indexing the turntable 12 comprises a gear 60 which is affixed to the shaft 11 or is bolted, screwed or otherwise secured to the turntable 12. The means for rotating the gear 60 comprises a stepping motor 61. The indexing means for the turntable 22 comprises a gear 62 which is secured to the shaft 21 or to the turntable 22 at a level below the platform 29 and is driven by a stepping motor 63.

The mode of operation of the apparatus 10 is as follows:

The apparatus 10 is operated cyclically. The turntable 12 is indexed through 45 degrees between successive cycles, and such indexing of the turntable 12 is followed by indexing of the turntable 22 through 90 degrees. Each indexing of the turntable 12 is followed by introduction of the armature 17 into the adjacent notch 16 of the wheel 15, and each indexing of the turntable 22 is followed by shifting of the armature 27 into the registering notch 26 of the wheel 25. Thus, the turntables 12 and 22 are held in accurately determined angular positions whenever the stepping motors 61 and 63 are idle.

Once the turntables 12 and 22 are brought to a standstill, the apparatus 10 performs the following operations which are carried out substantially simultaneously:

(1) The electromagnets 40 in or at the first portion 19 of the first endless path, which is defined by the first turntable 12, are energized to move the jaws 36 of the adjacent holders 14 radially inwardly so that the corresponding carriers 31 can receive discrete film units 7. The mechanisms which transfer film units from the magazine in the portion 19 of the first endless path onto the carriers 31 of the two holders 14 in the path portion 19 are not specifically shown in the drawing because their construction and mode of operation form no part of the invention. The disc film 7 in the magazine which is adjacent to the path portion 19 are maintained in a predetermined orientation so that the transfer of a disc film onto the adjacent carrier 31 results in automatic penetration of an orienting projection 31a of the carrier 31 into the notch or recess 7c in the hub 7b of such film with the result that the orientation of the film on the carrier cannot be changed accidentally during transport of such film with the respective carrier along the first path toward the second portion A and thence into the initial portion of the endless path which is defined by the second turntable 22. The electromagnets 40 in the portion 19 of the first path are deenergized on completion of transfer of two fresh films 7 onto the turntable 12 so that the respective jaws 36 then move radially outwardly and properly engage the respective disc films 7.

(2) The electromagnets 40 in or adjacent to the third portion 20 of the first endless path are energized simultaneously with the electromagnets 40 in the first portion 19 so that the respective jaws 36 become disengaged from the disc films 7 and such films can be removed from the respective carriers 31 and introduced into the magazine in or adjacent to the path portion 20. Energization of electromagnets 40 in the path portion 20 is followed by energization of electromagnets 41 so that the carriers 31 are lifted by the respective elevators 42 and thereby push the films 7 thereon onto the lower end portions of two mandrels (not shown) which are designed to "spear" the thus received films 7 and to maintain them in stacked condition. The mandrels are formed with detent means which prevent the freshly received disc films 7 from sliding downwardly and back into the endless path which is defined by the turntable 12. The electromagnets 41 are thereupon deenergized so that the corresponding carriers 31 are lowered and reassume their normal positions ready to accept fresh films 7 upon arrival into the first portion 19 of the first endless path. The electromagnets 40 are deenergized subsequent to deenergization of the electromagnets 41 to effect closing of the respective jaws 36. The turntable 12 is then ready for renewed angular movement through 45 degrees.

(3) The electromagnets 40 and 41 in the second portion A of the first endless path are also energized one after the other so that the jaws 36 release the film 7 on the respective carrier 31 before the carrier 31 is caused to move upwardly under the action of the respective elevators 42 and to enter the socket 30 of the platform 29. As mentioned above, each carrier 31 can at least substantially fill the socket 30. Such upward movement of the film 7 with the respective carrier 31 entails automatic penetration of the protuberance 48 of the registering rotor 44 into the central aperture 7a of the film 7 and the rib 49 of such protuberance enters the notch 7c. The turntable 22 is then indexed through 90 degrees before the carrier 31 is lowered back onto the turntable 12. Indexing of the turntable 22 entails a sliding movement of the protuberance 48 in the aperture 7a of the freshly lifted film 7 along the top surface of the stationary platform 29 and the advancement of the respective film 7 into the treating station B. At the same time, the film 7 which was located at the station D is returned into the initial portion A of the second path and onto the raised carrier 31.

When the indexing of the turntable 22 through 90 degrees is completed, the motor 54 lowers the support 53 and the clutchers 57 of the three prime movers 55 engage the respective rotors 44 at the treating stations B, C and D. The motors 55 begin to index the respective rotors 44 together with the protuberances 48 and the films 7 thereon. At the same time, the electromagnet 41 in the intermediate portion A of the second path is deenergized and the carrier 31 (with a film 7 thereon) is lowered back onto the turntable 12. Deenergization of the electromagnet 41 is followed by deenergization of the corresponding electromagnet 40 which actuates the jaws 36. Downward movement of the film 7 from the initial portion of the second path into the second portion A of the first path is ensured by the pins 50 which perform the function of ejectors and are shiftable by a suitable electromagnet, not shown.

Each of the stepping motors 55 indexes the disc film 7 therebelow fifteen times because each such film contains fifteen frames 8. However, it is also possible to replace the stepping motors 55 with motors which rotate the respective disc film 7 through 360 degrees without any interruptions. Such indexing or continuous rotation of disc films 7 at the stations B, C and D enables the decoding mechanism to read the information on the film 7 which is located at the station B, the monitoring or scanning mechanism to determine the characteristics (such as density and color composition) of film frames 8 of the film which is located at the station C, and the copying unit at the station D to make prints of some or all of the frames 8 forming part of the respective film 7. When the films 7 complete their angular movements at the stations B, C and D, the motor 54 lifts the support 53 with the prime movers 55 to disengage the clutches 57 from the respective rotors 44 and to simultaneously enable the detent elements 47 to enter the respective notches 46 so that the rotors 44 are held in predetermined angular positions as soon as they become disengaged from the respective prime movers 55. The turntable 22 is then indexed through 90 degrees and the motor 54 is actuated again to lower the prime movers 55 and to engage their clutches 57 with the rotors 44 therebelow. This results in automatic disengagement of detent elements 47 from the respective notches 46 so that the disc films 7 which have arrived at the stations B, C and D are ready to be indexed or continuously rotated for the aforediscussed purposes.

An important advantage of the improved apparatus is that the operations which are performed upon the films 7 in the first endless path (such as loading of films 7 in the first portion 19 and removal of films in the third portion 20) are effectively segregated from (i.e., they cannot influence) those operations which are carried out upon the films in the second endless path. The bulkier parts (such as the magazines in the first and third portions 19, 20 of the first path) are moved far away from the copying station D so that the arrangement of elements at such copying station need not be altered for the express purpose of installing the apparatus 10 in the copying machine. Moreover, the second turntable 22 is relatively small so that it can be readily installed in an existing copying machine (whose copying window is shown in FIG. 2, as at 65). The printing paper is transported in one of the directions indicated by the double-headed arrow 9 of FIG. 2, and the copying station D need not employ a rotary prism or other complex and expensive components solely because it must receive disc films. The distance between the magazines in the portions 19 and 20 of the first path and the copying station D can be selected practically at will (so that the positions and/or dimensions of various components in the region of the optical axis of the copying machine need not be altered at all or are changed only negligibly), and the same applies for the dimensions of the turntable 22 which must extend into the copying machine. The entire apparatus 10 can be assembled into a prefabricated module which is readily installed on the part 10a of the copying machine with a minimum of alterations and with little loss in time. Separation of the magazines for disc films from the means which transports the films to the various treating stations ensures that vibratory and/or other stray movements which are attributable to operation of the instrumentalities for delivering films into or for removing films from the first endless path are not communicated to disc films which are being treated at the station B, C and/or D.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for transporting exposed and developed disc films to and away from and for manipulating disc films at a copying station, comprising a first conveyor defining a first endless path, said first conveyor including a first indexible turntable; film supplying, film transferring and film receiving means adjacent to successive first, second and third portions of said path and respectively arranged to deliver discrete films into said path, to transfer the thus delivered films from and back into said path, and to receive films from said path; a second conveyor defining a second endless path having an initial portion adjacent to the second portion of said first path so that said transferring means can deliver films into and receive films from such initial portion, said second path further having an additional portion at the copying station, and said second conveyor including a second indexible turntable overlapping a portion of said first turntable in the region of said transferring means, said turntables being disposed in different planes which are at least substantially parallel to each other and are located at different levels, and said transferring means comprising elevator means for moving disc films between said levels; and means for rotating each disc film which reaches said additional portion on its way back to the initial portion of said second path.

2. The apparatus of claim 1, comprising discrete first and second indexing means for the respective turntables.

3. The apparatus of claim 1, wherein said planes are substantially horizontal.

4. The apparatus of claim 1, wherein said elevator means comprises carrier means for discrete films and magnetically operated displacing means for said carrier means.

5. The apparatus of claim 1, wherein said elevator means comprises carrier means for discrete films and film clamping means cooperating with said carrier means.

6. The apparatus of claim 1, wherein said second turntable is disposed above said first turntable and said second conveyor further comprises a platform arranged to constitute a base for the films which are being conveyed along said second path from said initial station to said additional station and thence back to said initial station.

7. The apparatus of claim 6, wherein said second turntable comprises means for entraining the films along said platform to thereby move such films along said second path.

8. The apparatus of claim 6, wherein said platform has a socket in register with the initial portion of said second path and said first turntable comprises a plurality of discrete carriers, one for each disc film in said first path, said transferring means including means for moving successive carriers from the second portion of said first path into said socket for entrainment of the film from the carrier in said socket toward said additional portion of said second path and for reception of a film arriving from said additional portion prior to returning to such carrier and of the film thereon into the second portion of said first path for transport toward the third portion of said first path.

9. The apparatus of claim 8, wherein each of said carriers is dimensioned to at least substantially fill said socket.

10. The apparatus of claim 6, wherein said second turntable comprises means for entraining the films along said platform to thereby move such films along said second path, said rotating means including means for rotating the films through the medium of said entraining means.

11. The apparatus of claim 10 for transporting and manipulating disc films of the type having a central aperture, wherein said entraining means comprises rotary protuberances arranged to enter the apertures of films which are transferred into the initial portion of said second path.

12. The apparatus of claim 11, wherein said rotating means comprises rotors operatively connected with said protuberances and prime mover means adjacent to said additional portion of said second path and arranged to drive the rotor which is located in the additional portion of said second path.

13. The apparatus of claim 12, further comprising a support for said prime mover means and means for moving said support between first and second positions in which said prime mover means respectively engages with and is disengaged from the rotor in said additional portion of said second path.

14. The apparatus of claim 13, wherein the means for moving said support includes a fluid-operated motor.

15. The apparatus of claim 12, further comprising means for maintaining each of said rotors in a predetermined angular position when the respective rotor is disengaged from said prime mover means.

16. The apparatus of claim 1, further comprising first and second indexing means for the respective turntables and detent means for holding the turntables in predetermined angular positions between successive indexing movements thereof.

17. The apparatus of claim 16, wherein the detent means for at least one of said turntables comprises a notched wheel coaxial with and arranged to share the angular movements of the respective turntable, a mobile detent element adjacent to said wheel, and means for moving said detent element into and from the notches of said wheel.

18. A method of transporting exposed and developed disc films toward and away from and for manipulating disc films at a copying station, comprising the steps of introducing disc films into a first portion of and conveying the thus introduced films along a first endless path; transferring successive films from a second portion of the first path into an initial portion of a second endless path, an additional portion of which is disposed at the copying station, and conveying successively transferred films along the second path, the second path overlapping a section of the first path in the region of the second portion of the first path, and the paths being disposed in different planes which are at least substantially parallel to each other and are located at different levels, said transferring including moving successive films between said levels; rotating successive films about their respective axes in the additional portion of the second path; advancing the thus rotated films into the initial portion of the second path and returning successive films into the second portion of the first path by moving the films between said levels; advancing the returned films into a third portion of the first path; and removing successive films from the third portion of the first path.

19. The method of claim 18, wherein said returning step takes place at least substantially simultaneously with the transfer of successive films from the first into the second path.

20. The method of claim 19, wherein the step of conveying films along the second path includes causing the films to advance along a plane surface.

* * * * *